United States Patent [19]
Herbert

[11] Patent Number: 4,516,977
[45] Date of Patent: May 14, 1985

[54] STORAGE BAG

[75] Inventor: Reinhold Herbert, Neu-Anspach, Fed. Rep. of Germany

[73] Assignee: Fresenius, AG, Fed. Rep. of Germany

[21] Appl. No.: 580,850

[22] Filed: Feb. 16, 1984

[30] Foreign Application Priority Data

Feb. 17, 1983 [DE] Fed. Rep. of Germany ....... 3305365

[51] Int. Cl.$^3$ ............................................. A61M 5/14
[52] U.S. Cl. .................................. 604/415; 604/408; 604/403; 215/247; 128/DIG. 24
[58] Field of Search .................. 604/403, 408–415, 604/262, 905; 150/DIG. 1, 1, 8, 9; 206/0.5, 438, 484, 486, 828

[56] References Cited

U.S. PATENT DOCUMENTS

| | | | |
|---|---|---|---|
| 3,940,802 | 3/1976 | Sako | 3/1.4 |
| 4,326,576 | 4/1982 | Pallaroni | 150/8 |
| 4,362,158 | 12/1982 | Lena | 128/272 |
| 4,393,909 | 7/1983 | Pearson | 150/8 |
| 4,412,573 | 11/1983 | Zdeb | 604/415 |
| 4,439,192 | 3/1984 | Leurink | 604/408 |
| 4,441,538 | 4/1984 | Larkin | 604/415 |
| 4,453,940 | 6/1984 | Aoyagi et al. | 604/408 |

Primary Examiner—C. Fred Rosenbaum
Assistant Examiner—Mario Constantino
Attorney, Agent, or Firm—Omri M. Behr

[57] ABSTRACT

The invention relates to a storage bag, in particular for medical purposes for storing blood or infusion solutions, comprising a thermoplastic polymer material and having at least one outlet comprising a tube member.

19 Claims, 11 Drawing Figures

STORAGE BAG

The invention relates to a storage bag, in particular for medical purposes for storing blood or infusion solutions, comprising a thermoplastic polymer material and having at least one outlet comprising a tube member.

Bags of the aforementioned type are used in millions in medicine. They serve for example for accommodating blood as blood bag or for sterile storage of infusion solutions for parenteral administration. For this purpose, they must be completely sterile and this is generally done by heating to at least 100° C., in particular about 120° C. This itself requires that the thermoplastic polymeric material must be stable at least up to the heating temperature.

In addition, such a bag must be easy and cheap to manufacture in an automated production process and because of its low value disposable after use. Furthermore, it should be flexible, foldable and in the processed state so transparent that changes of the fluid contained in the bag can be immediately noticed.

The only polymer to fulfill these requirements so far is flexible polyvinyl chloride (flexible PVC), i.e. PVC containing plasticizers for improving the elastic properties. These plasticizers, for example diisooctyl phthalate have however disturbing effects. Thus, these substances are not completely locked in the voids between the polymer chain and can therefore be dissolved out by the water or aqueous solution with which the bag is filled and this leads to contamination of the fluid contained in the bag.

Estimates have shown that a patient treated for a longer period using such PVC bags has absorbed a few grams of plasticizer and this has very serious physiological aspects and can lead to permanent harm to the patient.

In addition, a bag of flexible PVC is very prone to attack by microorganisms which in particular dissolve out the plasticizers and thus effectively destroy the bag. As a result, after filling of such a PVC bag it had to be protected from harmful microorganisms by a special enclosing package.

A result of these facts was that such PVC bags have not to an appreciable extent been able to replace the glass bottles generally employed to store medical solutions, and in fact are even not permitted at all for medical uses in some industrial countries.

Attempts have therefore been made to replace the flexible PVC by other substances. However, these attempts failed because these substances were either too expensive or had mechanical and physiological disadvantages. For example, their water vapour permeability was too high, leading to an undesirable increase in the concentration of the substances contained in the solution. In addition, they set free constituents which could be leached out or were easily damaged if subjected to high mechanical stress.

CH-PS No. 444 382 described such a plastic bag which can be used for therapeutic fluids for parenteral administration. In this plastic bag the wall consists of a plastic laminate having on the outside, i.e. the side remote from the fluid, a PVC layer and on the inside a polyhalogen hydrocarbon synthetic resin layer. This layer contains no constituents which are inadmissible from the pharmacological point of view and which could be dissolved out into the solution contained in the bag. However, the polyhalogen hydrocarbons used have the disadvantage that they are very expensive to produce and process and do not fuse adequately at the weld seams so that there is still direct contact with the PVC. This contact is moreover also present at the outlet opening which is generally made completely from PVC and which can be connected to further PVC connecting flexible tubes. Moreover, such a one-way bag is detrimental to the environment because burning of such bags leads to highly aggressive hydrogen halides.

A further bag is described in U.S. Pat. No. 4,140,162. This bag consists of a plastic composition with three components. These components are a polyolefin, which consists substantially of propylene units, a block copolymer and, possibly, a plasticizer which can also be a polymer. Furthermore, this bag includes antioxidants which are certainly undesirable as regards hygiene.

It is apparent from the above enumeration of the components that both the components themselves and the processing of these components are expensive and both for production process reasons and costs reasons a bag made therefrom will no doubt not be able to replace the usual PVC bags.

This led the same applicants to file an application for a further plastic composition for making connecting or bonding elements between PVC flexible tubes on the one hand and polyolefin bags on the other, in the form of DE-OS No. 30 26 974. This plastic composition again consists of a plurality of polymeric components and the above remarks again apply as regards their production and price. Furthermore, this connecting member must be welded both to the polyolefin bag and to the PVC flexible tube which usually encounters technical difficulties as regards the method and moreover increases costs.

It must be remembered in particular that all the solutions proposed employed PVC connecting flexible tubes or hoses which contain of course plasticizers and in this respect are undesirable.

These connecting flexible tubes or hoses, which are usually welded as outlet means to the PVC bags, have the desired highly elastic properties necessary for holding closure members or insert stoppers. Thus, the fluid contained in the bag must not be able to leak out between the outlet tube and the stopper when sterilizing by heating to about 120° C. In addition, the closure member must be firmly surrounded by the tube and consequently can only be pulled out on exerting a high force.

In DE-PA No. 3,200,264 attempts were made to solve this problem by making polyolefin bags with a flexible tube connecting piece or insert comprising a crosslinked copolymer of olefin and vinyl acetate. The bag was welded to the tube connecting piece or insert of a copolymer, not yet crosslinked, of olefin and vinyl acetate and thereafter the entire bag subjected to the crosslinking treatment.

It should also be remembered that in the food industry plastic bags have been used for a long time for packing foodstuffs and the bag can possibly have an outlet means of the same material which is sealed by welding. However, such outlet openings do not have the aforementioned highly elastic properties and can only be sterilized if the bag itself can be sterilized.

Consequently, the problem underlying the present invention is to provide a bag of the type mentioned at the beginning which comprises at least one outlet means of a material different to the bag material and is stable and heat-sterilizable at temperatures of at least 100° C.

This problem is solved according to the invention by the characterizing features of claim 1.

With the invention a bag is obtained which can be made using very inexpensive plastic materials, such as polyethylene. The usual extrusion methods for making sheets or tubular films can be used and do not present the expert with any notable problems.

The outlet tube members or inserts, which are substantially rigid, and preferably rigid, are also made of very inexpensive plastic materials and by simple conventional methods. For medical purposes, the use of polycarbonates and other hard plastics as material for tubing, extension pieces, plugs and stoppers and other relatively rigid articles is already known. It is however also known that it is not possible to secure tube members consisting of such materials in storage bags of polyolefins because polyolefins cannot be fused to hard plastics materials and consequently a tight seal cannot be obtained between the bag and tube member.

According to the invention it has surprisingly been found that it is possible to join tube members and inserts of hard plastics materials to the polyolefin bag by using a bonding layer.

This bonding layer, which is inserted as layer between the tube member or insert and the bag, also proceeds from very inexpensive olefin starting materials which are copolymerized with a certain proportion of vinyl acetate (VAC). As is known, this copolymer of olefin and vinyl acetate with increasing VAC content exhibits an abrupt rise in the impact resilience which is a measure of the elasticity of the material. Thus, for example, with a copolymer of ethylene and vinyl acetate (EVA) with increasing VAC content the impact resilience increases but on the other hand the melting temperature in the VAC range of interest decreases to values below 100° C. so that a sterilization of a bag having such a bonding layer does not appear possible.

Admittedly, it is possible to thermally stabilize flexible tubes or hoses on the basis of VAC-containing polyolefins by crosslinking and even to improve them further in their elasticity behaviour but it is not possible to weld these crosslinked tubes to the starting olefin used as bag material; no bond is formed between the polyolefin and crosslinked copolymer of olefin and VAC. Consequently, in DE-PA No. 3,200,264 the procedure adopted is to fuse together a polythene bag and an uncrosslinked tube of a copolymer of olefin, in particular ethylene, and VAC and thereafter carry out the crosslinking.

Now, according to the invention it has further surprisingly been found that the bonding layer of a copolymer of olefin, in particular ethylene, and VAC or of the polyurethane, can be fused both to the polyolefin bag and to the tubular member or insert consisting of hard plastic, in particular polycarbonate, and thereafter can be sterilized under pressure without a previous crosslinking being necessary. Although in the sterilization the copolymer of olefin and vinyl acetate or the polyurethane is greatly softened, a bag is nevertheless obtained which is completely leak-free has excellent mechanical properties and excellent securing properties at the tube members so that elastic coupling or extension or attachment members secured thereon cannot be pulled off. The tube member or insert is firmly connected via the bonding layer to the polyolefin bag in a completely sealed and leak-free manner. The tube members or inserts cannot be pulled out of the bag without destroying the latter. Such a sterilizable bag for medical purposes is therefore at least equivalent to a conventional PVC bag insofar as its mechanical properties are concerned.

In addition, it is free of plasticizer because the polyolefin materials in sheet form usually employed as bag mataerial contain no plasticizer additives and consequently attack by microorganisms is effectively prevented. As a result, the bag according to the invention is in every respect more hygienic than the PVC bags frequently employed today.

The polyolefins which can be used as polymer for making the bag according to the invention include polymers of olefins, such as ethylene, propylene, butylene, and the like. As starting olefin ethylene is preferred which may possibly be substituted with one or more groups.

Possible substitutents are for example the methyl or ethyl group, the vinyl group and halogen atoms, in particular fluorine atoms.

Particularly preferred is ethylene polymerized to polyethylene.

Specific examples of polyolefins are polyethylene, polypropylene, poly-n-butylene, polyisobutylene, poly-4-methylpentene-1, chlorosulfonated polyethylene, polystyrene, halogenated polyethylenes, such as polyvinyl fluoride, polyvinylidene fluoride and polyvinylidene chloride, polymethyl methacrylate and the like. The olefins used to produce the above polyolefins may also be used as copolymers and mixed polymers with other vinyl compounds, for example ethylene/propylene plastics, poly(ethylene/vinyl acetate), acrylonitrile/butadiene/styrene polymers, ethylene-propylene block copolymers, styrene copolymers, copolymers containing vinylidene fluoride and copolymers containing styrene.

According to the invention, polyolefins are products which are made by vinyl polymerization of possibly substituted ethylene. These products can also have additives of other polymers which do not substantially disturb or change the structure of these polyolefins. Thus, for example, small amounts of styrene or polyacrylonitrile-substituted ethylene compounds may be added. The resulting polyolefin products are considered to come under the aforementioned polyolefins.

According to the invention, as polyolefin polyethylene is used as material for the bag which can possibly have small amounts of additive of vinyl acetate in the form of the copolymer of ethylene and vinyl acetate. In such a case, for example, the vinyl acetate content may be up to 10% by weight.

In particular, a polyethylene of medium to high density (MDA and HDA) is used which is generally made by low-pressure polymerization. The density lies in a range of 0.91 to 0.94, in particular about 0.935 g/cm$^3$.

Furthermore, the polyethylene preferably used according to the invention has a high molecular weight and a narrow molecular weight distribution. In every case, however, it should be ensured that such polyolefins do not have a melting point below the sterilization temperature of 110°–120° C. Preferably, the melting range should be above 116° C, in particular 120°–124° C., whilst the Vicat softening temperature according to DIN 53 460 should be above 115° C.

The oxygen permeability of the aforementioned polyolefins can be a problem in the case of solutions which are kept for long periods of time, an oxidation of the dissolved constituents being possible. This is critical in particular with amino acid solutions and must therefore be eliminated with certainty. To overcome this problem, advantageously the bag sheet of the aforementioned polyolefin may be coated with one or more films reducing this oxygen permeability, for example a metal foil or another polymer. Such a coating is advantageously also employed for safety reasons because even with extremely careful manufacture the bag sheet has pin holes which cannot be seen and can impair the sterility of the solution contained in the bag.

Furthermore, such an outer coating can also considerably improve the mechanical stressability of such a bag so that it will not burst even if dropped from a height of several meters.

Advantageously, a film or layer is used which has a higher melting point than that of the polymer facing the solution, i.e. which does not melt at the melting temperature of the inner sheet and consequently does not adhere to the sealing tool. Such an outer film can therefore also be used as parting agent in the sealing of the inner sheet.

As polymer for making such a laminate any of the aforementioned polyolefins may be used. However, polymers are preferred which have a low water vapour permeability and a low oxygen permeability. These include polyamides, PVC, polyvinylidene chloride, polyvinyl fluoride, polytrifluorochloroethylene, polyethyleneterephthalate, polyester and the like. Particular preferred are polyamide, polyvinylidene chloride, polyethyleneterephthalate and polyester.

As polyamide, advantageously a polycaprolactam is used that can be treated and sterilized at 120°–140° C. with superheated steam without damage. Advantageously, this polyamide contains no stabilizing additives and thus in its composition meets the requirements for use in the foodstuffs industry.

The polymeric outer and inner sheets are advantageously adhered together by means of a laminating adhesive, such as polyvinylidene chloride or a polyurethane. Such a polyurethane adhesive may advantageously be a two-component adhesive, the first adhesive consisting of laminating adhesive, and the second component of an additive lacquer.

As regards the production technique, the polyolefin used as inner sheet may be extruded in the form of a tubular film and thereafter adhered to a laminating film using the aforementioned laminating adhesive, polyurethane being preferred. If PVC is used as outer sheet, the polyolefin sheet according to the invention ensures that the plasticizers present in the PVC do not diffuse through the laminating adhesive and the polyolefin film into the solution contained in the bag.

Preferred laminates have at a temperature of about 23° C. and a relative humidity of 85% as a rule a water vapour permeability according to DIN 53122 of <1. Such values apply to standard laminates which are advantageously up to 0.2 mm thick, having a thickness of 50–100, in particular about 75 μm for the polyolefin sheet and 20–100, in particular 30–70 μm, for the laminating film, such as polyamide.

Furthermore, with such preferred laminates the oxygen permeability is lowered, this value lying beneath 15 $cm^3/m^2 \times day \times bar$ pressure difference.

Such sheets and films are approved both by the Federal Board of Health and by the FDA (Federal Drug Administration) in the USA because of their physiological neutrality for use in the foodstuffs industry and the medical field.

As already mentioned above, the polyolefin sheet adjacent to the liquid in the bag contains no plasticizers or additives which might be physiologically dubious and in particular could dissolve into the aqueous solution. Furthermore, the polyolefin sheet possibly provided with an organic laminating film is clear and transparent and still has these properties even after sterilization.

As materials for the tube members or inserts used according to the invention, which are substantially rigid, preferably however rigid, and advantageously transparent, hard plastics or hard polymers are used, i.e. plastics which can only be appreciably deformed at excess pressures of at least 1 bar and are neutral from the medical point of view, i.e. have no disadvantageous effects on the patient. Of these hard plastics, preferably hard PVC, polypropylene, polyamides, polycarbonates, polyesters, polyacrylates and the like and/or copolymers thereof and styrene-containing copolymers thereof, in particular however polycarbonates, are used.

Suitable polycarbonates are for example those obtained from 4,4'-dioxydiphenylalkanes, for example 4,4'-dioxydiphenylmethane, 4,4'-dioxydiphenyl-1, 1-ethane, 4,4'dioxydiphenyl-1,1-butane, 4,4'-dioxydiphenyl-1, 1-isobutane, 4,4'-dioxydiphenyl-1, 1-cyclopentane, 4,4'-dioxydiphenyl-1, 1-cyclohexane, 4,4'-dioxydiphenylphenylmethane, 4,4'-dioxydiphenyl-2, 2-propane, 4,4'-dioxydiphenyl-2, 2-butane, 4,4'-dioxydiphenyl-2, 2-pentane, 4,4'-dioxydiphenylmethylisobutylmethane, 4,4'-dioxydiphenyl-2, 2-hexane, 4,4'-dioxydiphenyl-2, 2-nonane, 4,4'-dioxydiphenylmethylphenylmethane, 4,4'-dioxydiphenyl-4, 4-heptane or 4,4'dioxydiphenyl-1, 2-ethane. A suitable polycarbonate is for example the polycarbonate obtained from 4,4'-dioxydiphenyl-2, 2-propane (bisphenol A) and carbonic acid.

The suitable polyesters include both saturated linear polyesters and also unsaturated and aromatic polyesters such as polyethyleneglycol terephthalate, polybutylene terephthalate or polyether ester.

The polyamides used include those for which as starting materials straight-chain Ω-aminocarboxylic acids of the chain length $C_6C_{12}$ and their lactums, adipic, sebacic, dodecanedicarboxylic and heptadecanedicarboxylic-hexamethylene diamine, isophthalic acid, bis(4'-aminocyclohexyl)-methane, 2,2-bis-(4'-aminocyclohexyl)-propane, 3,3'-dimethyl-4,4'-diaminodicyclohexylmethane, terephthalic acid or their dimethyl esters, 1,6-diamino-2,2,4-trimethylhexane, 1,6-diamino-2,4,4-trimethylhexane, 1-amino-3-aminomethyl-3,5,5-trimethylcyclohexane, polyethylene, copolymers of ethylene, propylene, butylene, vinyl esters and unsaturated aliphatic acids and their salts and esters are used.

According to the invention polyacrylates means polyacrylic acid esters which are derived both from acrylic acid and from methacrylic acid, for example polymethylmethacrylate.

As material for the bonding layer a copolymer of an olefin with vinyl acetate or a polyurethane is used. Examples of polyolefins made from this olefin are polyethylene, polypropylene, poly-n-butylene, polyisobutylene, halogenated polyethylenes, chlorosulfonated polyethylenes, etc., as already named above. Preferably, polyethylene is used. Such copolymers have a vinyl acetate content of 5–70, preferably 10–50, in particular 15–40% by weight. For example, the vinyl acetate content may be 28% by weight. As already explained above, the melting point of polyethylene decreases with increasing vinyl acetate content from about 125° C. to about 70° C. when the VAC content is 30% by weight. Such a copolymer melts of course at a sterilization temperature above 100° C. On the other hand, the required impact resilience of said copolymers increases with increasing VAC content from 35–55% at 30% VAC content.

In addition, such a material can be fused without problems to the material of the bag, if substantially similar or even identical polyolefin materials are used, and to the material of the tube member or insert. The use of substantially the same polyolefin materials for the bonding layer and the bag is therefore preferred. Preferably, as material for the bonding layer a copolymer of ethylene and vinyl acetate is used having the aforementioned weight ranges, and as bag material advantageously polymerized ethylene or propylene compounds can be used. Particularly preferred is the combination of EVA as material for the bonding layer and polyethylene as bag material with the aforementioned weight ranges.

Among the suitable polyurethanes are for example those whose production employs polyester polyols on the basis of carbonic acid, adipic acid, phthalic acid, trimellitic acid, sebacic acid, maleic acid or ethanediol, copolymers of vinyl chloride and vinyl acetate and/or vinyl propionate, in which free hydroxyl groups can be contained, epoxy compounds made from (4,4'-dioxy-2,2'-diphenyl)-propane and epichlorohydrin, as well as vinylidene chloride copolymer.

The thickness of the bonding layer is not critical. It should however be at least 0.1 mm and for practical considerations not more than 7 mm. Preferably, the bonding layer is 0.1–4 mm thick.

According to the invention, the term "tube member" or "insert" means a tubular body or an insert comprising one or more tubular bodies or tubular openings establishing the flow connection between the interior of the bag and the tubing, infusion apparatuses, catheters, syringes and the like, connected to the outer end of said tubular bodies or openings. It also means an insert piece which is welded into the bag via the bonding layer and has at least one corresponding outlet opening without said insert projecting in the form of a tube or hose from the bag edge. Similarly to a tube member, such an insert is provided with a bonding layer, then introduced into the non-sealed edge region of the bag and finally heat-fused to the bag.

As already indicated, according to the invention the tubular members or inserts may terminate directly at the bag edge without a part thereof projecting in tubular form beyond the bag edge. This embodiment is suitable and intended for the insertion of elastic plugs or extensions into the tubular openings.

According to another embodiment of the invention the tube members or portions of the inserts may project in tubular manner beyond the bag edge and are intended for the fitting thereover or therein of a tube or extension of highly elastic physiologically neutral material, such as rubber crosslinked EVA and the like. The tube members themselves or the portions extending in tubular manner from the insert may also be made funnel-shaped or pear-shaped and with the funnel-shaped widenings project beyond the bag edge, said widenings possibly also comprising a diaphragm of material usually employed for this purpose and a cap of elastic material or a pierceable insert, for example of latex, i.e. may be formed as infusion stoppers or injection or syringe plugs.

The manufacturing and processing of the bag materials is by the methods usual in the plastics art. Thus, for example, as explained above the bags can be made by extruding tubular films or sheets, appropriate cutting to size of the sheets and subsequent edge welding. This bag, in which the edge where the outlet means is to be provided remains unwelded, is subsequently welded or fused to a tube member having an aforementioned bonding layer or to an insert comprising the outlet opening(s) and surrounded by a bonding layer. For this purpose, the tube or insert is provided with an aforementioned bonding layer by the usual technique, which can be done for example by simply drawing or slipping the elastic material in hose form onto the tube member or insert, and introduced into the opened bag.

Then, the heat sealing of the entire still unwelded edge with the tube member or insert provided with the bonding layer is effected. If a plurality of tube members are provided this processing step is of course carried out simultaneously, using of course appropriate sealing tools. In heat sealing, which is carried out according to the usual method, the bag is heat sealed to the bonding layer and the bonding layer is also heat sealed to the tube member or insert.

The bag made in this manner has substantially the same properties as a PVC bag with the exception that the bonding layer consisting of EVA greatly softens in sterilizing above about 80° C. but is held in place by the tube member and the heat-resistant sheet. The seal seam formed between the bag, the bonding layer and the tube member or insert, is so strong that said member or insert can be removed only by force.

The bags made in this manner are sterilized by the usual methods in an autoclave; of course, in the autoclave an excess pressure must be applied to compensate the pressure in the interior of the bag and prevent the bag bursting. However, for safety reasons and for fixing the bonding layer a higher excess pressure is used than is necessary for compensating the pressure obtaining in the bag interior. The magnitude of this excess pressure beyond the pressure obtaining in the bag is not critical but it should be at least 0.5 bar greater than the pressure in the bag. It may be 2 to 3 bar, for example 2.2 bar.

Thus, for example, the heat-sealed bag comprising a tubular member and the bonding layer is filled for example with water or the corresponding solution to be sterilized (e.g. electrolyte solution) and introduced into a high-pressure autoclave where it is sterilized at a temperature of about 120° C. and an excess pressure of about 2.2 bar.

As already mentioned, it has surprisingly been found that although during this treatment the copolymer of olefin and vinyl acetate used for the bonding layer melts the bag nevertheless remains completely sealed and leak-free and its weight remains constant, i.e. no weight loss or increase takes place.

The bags according to the invention will be further explained by the accompanying drawings and the following explanations.

Figure 1:
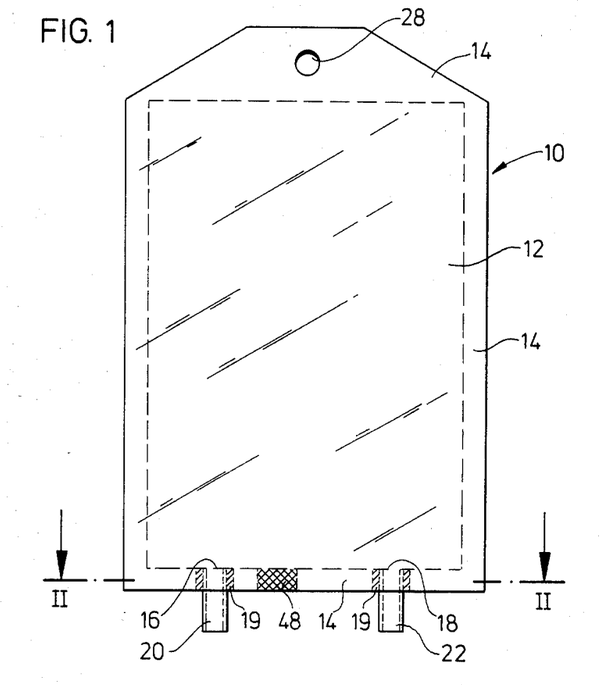
FIG. 1 shows schematically a bag according to the invention for infusion purposes.

The bag 10 consists substantially of the chamber 12 enclosed all round by a weld edge 14, said bag 10 having two outlet openings 16 and 18 which are each in connection with a tube member 20 and 22 as outlet means. Via these tube members 20 and 22 the fluid to be stored, for example an infusion solution or blood, can be introduced into the chamber 12 of the bag 10, and one or both tube members can be used as introduction connecting tubes.

Such a bag is usually made by first placing the sheets required to make the bag on each other and then forming the weld edge 14, the outlet openings 16 and 18 not being subjected to the welding. Thereafter, the tube members 20 and 22 each provided with the bonding layer 19 are introduced into the outlet openings 16 and 18 and the bag sheets then welded along the outer periphery thereof. The bonding layer 19 may be fitted to the tube members in that a hose length of the material used as bonding layer is drawn or slipped over the tube member 20/22. Possibly, the bonding layer and tube member can be fused before introduction into the openings 16 and 18. As explained above, the polyethylene preferably used as bag material is fused to the copolymer of ethylene and vinyl acetate preferably used as material for the bonding layer 19 and the polycarbonate preferably used for the tubular member 20/22 and thereafter a sterilization of the bag is carried out at preferably about 120° C. and about 2 bar excess pressure in a high-pressure autoclave.

Figure 3:
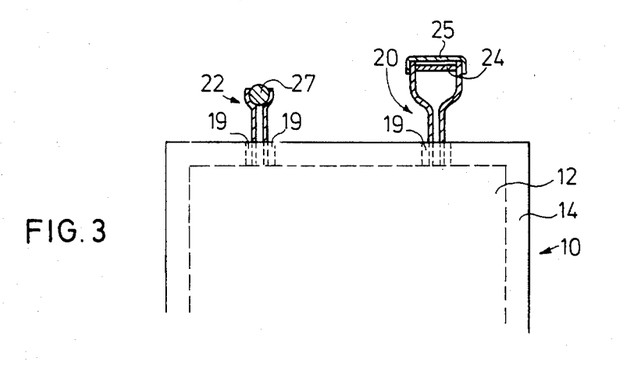
FIG. 3 shows the edge region of a further embodiment of the bag according to the invention with syringe or injection plug and infusion plug.

For infusion purposes, according to FIG. 3 the tube member 20 may be funnel-shaped, the widened end face being sealed by a pierceable sterile diaphragm 24 of the usually employed chlorobutyl rubber. This diaphragm 24 is connected by the usual techniques to the tube member preferably consisting of polycarbonate and for reasons of hygiene is provided with a cap 25.

For injecting solutions or the like in accordance with FIG. 3 the other tube member 22 may also be made funnel-shaped and comprise a pierceable insert 27 preferably of latex. Both the tube member 20 and tube member 22 are surrounded by the bonding layer 19.

Since the bag 10 is usually suspended with the tube members 20/22 at the bottom to enable the solution in the bag to flow out easily, the edge 14 opposite the tube members 20/22 may have an opening 28 into which a hook-like securing member of a stand or the like can be introduced to secure and position the bag 10.

Figure 2:
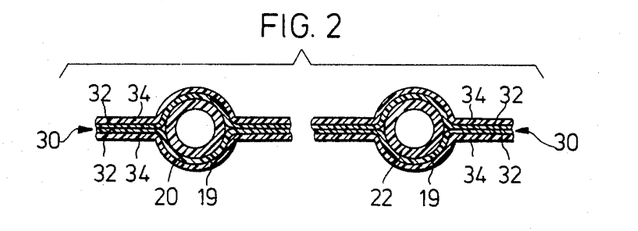
FIG. 2 is a section through the bag along the line II—II of FIG. 1.

According to the embodiment illustrated to a larger scale in FIG. 2 the bag material consists of a laminate 30 in sheet form. Said laminate 30 comprises according to the particularly preferred embodiment on the side facing the solution a polyethylene sheet 32 which usually has a thickness of 30–100, preferably 75 μm. The polyethylene used is preferably a material having a density of 0.935 g/cm³, a melting range of about 121°–124° C. and a Vicat softening temperature of about 118° C.

Adhered to said polyethylene sheet 32 by means of a polyurethane adhesive is a polyamide sheet 34, having usually a thickness of about 30–70 μm.

It is further apparent from FIG. 2 that the polyethylene sheet 32 comprises in the transition region to the tube members 20 and 22 a bonding layer 19 which establishes an intimate bond between the sheet and the tube member 20, 22 so that the tube members 20, 22 can be pulled out of the bag only by destroying the entire bag.

Figure 4:
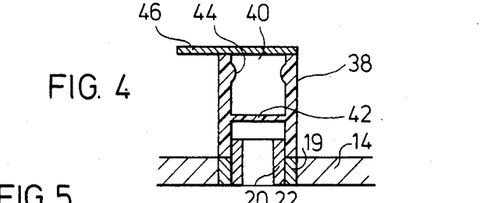
FIG. 4 is a side view of the edge region of a bag according to the invention comprising an attached extension of EVA.

FIG. 4 shows a fragment of the edge region of an embodiment of the bag according to the invention, attachments or extensions 38 being provided on the tube members 20 and 22.

Pulled over the end region of the tube members 20, 22 is an extension 38 which comprises in the vicinity of the introduction opening 40 a diaphragm which extends transversely across said opening 40 and hermetically seals the interior of the bag from ambient influences. Said diaphragm 42 is punctured in use with the tip of an infusion apparatus not shown so that the fluid contained in the bag can flow off through said apparatus. Since as explained above the bag 10 is usually suspended with the head at the top, i.e. with the tube members 20, 22 pointing downwards so that the fluid in the bag can run out unless an effective seal is provided between the tip of the infusion apparatus and the extension wall; said extension wall comprises in the region of the introduction opening 40 advantageously an annularly extending bead 44 which can bear sealingly on said tip when the diaphragm 42 is pierced. In the sealing in of the tube members with bonding layer the tube and even a latex ball represent the mandrel. No further aids are required for the inner calibration.

Since the diaphragm 42 should remain sterile even after sterilization in the autoclave the introduction opening 40 is covered with a peelable closure strip 46 which can be stripped off when necessary.

The embodiment shown according to FIG. 4 can of course have a special introduction opening 48 in the edge of the bag 10 as shown hatched in FIG. 1, which like the outlet openings 16 and 18 is formed prior to the welding in the manufacturing of the bag. This opening 48 permits the bag to be filled and after filling can be fused together or sealed in the usual manner.

Figure 5:
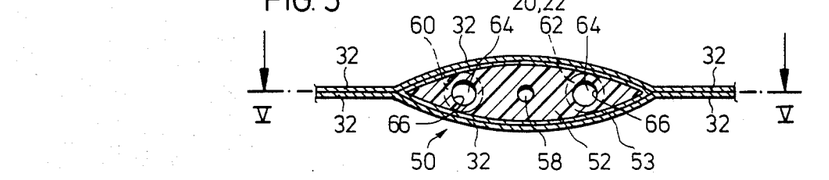
FIG. 5 is a fragment of a plan view of an insert having tubes and extensions or attachments projecting beyond the bag edge but without tear-off cover.
Figure 6:
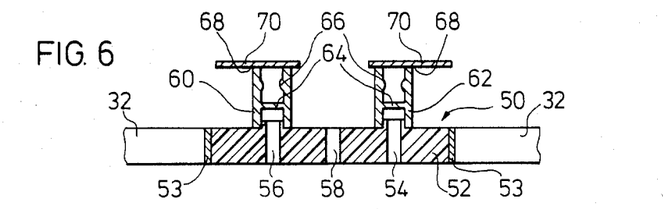
FIG. 6 is a section through the embodiment according to FIG. 5 along the line V—V.

A further embodiment is shown in FIGS. 5 and 6. An insert 50 is provided which as shown in FIG. 5 can have a lens-like structure and is surrounded with a bonding layer 53. This structure facilitates at the edges of the welding to the inner sheet 32 so that an almost smooth transition is guaranteed between the weld edge 14, the bonding layer 53 and the insert body 52.

According to the embodiment shown in FIGS. 5 and 6 this insert body 52 is traversed by inlet and outlet openings 54 and 56. Furthermore, it comprises a filling opening 58 under the condition mentioned below.

The inlet and outlet openings 54 and 56 are provided in each case with a tubular attachment extension 60 and 62, and the extension pieces 60 and 62 may be formed according to the embodiment shown in FIG. 4. Thus, they may again comprise diaphragms 64 and annular beads 66, this arrangement making the filling opening 58 necessary which can be reliably sealed with an appropriately matching plug after the filling.

However, the insert body 52 may also have one or more outwardly projecting tube members 20, 22 widening in funnel-like manner as shown in FIG. 3 and these tube members may possibly comprise diaphragms 24 and caps 25 or pierceable inserts 27 as illustrated in FIG. 3, i.e. can be formed as infusion plugs, syringe or injection stoppers.

According to the embodiment shown in FIG. 6 the edges of the attachment extensions 60 and 62 are connected via weakening lines 68 to a tear-off cover 70 in each case, which firstly keeps the diaphragm 64 sterile until use and secondly can be simply torn off before use.

Of course, in the embodiment shown in FIGS. 5 and 6 as well no membrane 64, beads 66 or tear-off cover 70 need be provided, making the filling opening 58 superfluous. Furthermore, a hose-like extension 60 or 62 or several such extension pieces may of course also be provided.

Figure 7:
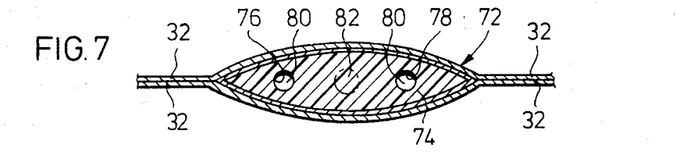
FIG. 7 is a further embodiment in plan view which is similar to the embodiment of FIG. 5
Figure 7A:
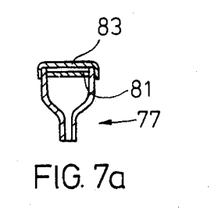
Figure 7B:
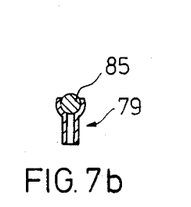

FIG. 7 shows a further embodiment of such an insert 72 which comprises substantially a likewise preferably lens-shaped insert body 74 which corresponds substantially to the form of the insert body 52 but has no portions projecting like tubes. The thickness of these insert bodies 52 and 74 is so dimensioned that it coincides with the weld edge 14 and consequently with these bodies 52 and 74 projecting portions are avoided. Thus, with the insert body 74 shown in FIG. 7 the tubular attachements 60 and 62 shown in FIG. 6 are dispensed with so that said body 74 is only traversed by inlet or outlet openings 76 or 78. The plugs 77 or 79 of elastic material shown in FIGS. 7a and 7b may be advantageously inserted into said inlet and outlet openings 76 or 78 and comprise a diaphragm 81 and a cap 83 or a pierceable insert 75 and are internally reinforced (not shown). On the other hand, the inlet and outlet openings 76 and 78 may of course be sealed in accordance with the embodiment shown in FIG. 4, i.e. a diaphragm 80 may be provided which is preferably disposed at the lower surface of the insert body 74. In such a case, a filling opening 82 is again provided as indicated in FIG. 7 in dashed line. Said filling opening 82 can again be sealed with an appropriately fitting plug.

The inlet and outlet openings 76 and 78, if a diaphragm 80 is provided, may be covered in sterile manner with a peelable sheet which is not shown and which covers the surface of the insert body 74.

Figure 8:
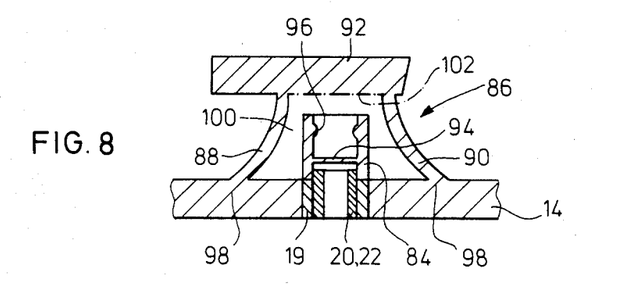
FIG. 8 is a fragment of a sectional view of an embodiment showing the surrounding of a tube member with an attachment.

FIG. 8 shows a sectional view of another embodiment which corresponds substantially to the embodiment of FIG. 1, a tubular attachment extension 84 being fitted to a tube member 20, 22 which is lead into the bag 10 in the region of the edge 14.

The cut of the embodiment of the bag 10 shown in FIG. 8 corresponds substantially to the blank of the bag shown in FIG. 1 with the provision that in the region of the tube members 20, 22, bonding layer 19 and extensions 84 the two sheets forming the bag each comprise regions 86 projecting in tab-like manner beyond the sheets which on appropriate welding of their edges 88, 90 and 92 can completely surround in sealing manner the tube members 20,22, the bonding layer 19 and the tubular extension 84. Consequently, the tube member 20, 22 with the bonding layer 19 and the tubular extension 84, which in this embodiment is again sealed with a diaphragm 94 and has a corresponding bead 96, as explained in the above embodiments, are sealed from the outside in sterile manner when this area has been welded.

In the bag production the edge 14 is firstly welded together only up to the region 98 so that the region 86 formed by two tab-like sheet configurations remains open. Thereafter, into said opened region 86 the tube member 20, 22 is introduced with bonding layer 19 and extension 14, the welding round of said tube member with bonding layer and extension 84 being effected in the region of the weld edge 14, i.e. said weld edge 14 is completely closed along the bag periphery. The region still open at its edges 88, 90 and 92 is then welded together along said edges 88, 90 and 92 as illustrated in FIG. 8, the interior 100 of said region 86 remaining unwelded.

Advantageously, at the transition between the inner space 100 and the edge 92 a weakening line 102 is provided which when the edge 92, preferably in the form of a grip tab, is subjected to a corresponding force can be torn open, thus completely removing the edge 92.

Of course, a plurality of tube members 20, 22 and extensions 84 may be surrounded by a region 86 or alternatively a plurality of regions 86 may surround in each case a tube member 20, 22 with extension 84. For example, the embodiment shown in FIG. 1 with two tube members/extensions may have two regions 86 separate from each other and a filling opening 48 which is not covered by said regions. On the other hand, all three openings towards the bag may be completely surrounded by a region and this type of sealing is not dependent upon whether the extensions are sealed by a diaphragm or possibly by hollow plugs.

As material for the tube members 20, 22 and the inserts 50, 72 preferably rigid PVC, polypropylene, polyamides, polycarbonates, polyesters, polyacrylates, in particular polycarbonates are used whilst as material for the bonding layer preferably a copolymer of ethylene and vinyl acetate having a vinyl acetate content of 5–50% by weight, in particular 15–40% by weight, is used, and as material for the attachment extensions 36, 60 and 62 and 84 and the plugs 77 and 79 a copolymer of ethylene and vinyl acetate is chosen with a vinyl acetate proportion of preferably 25–35% by weight.

Figure 9:
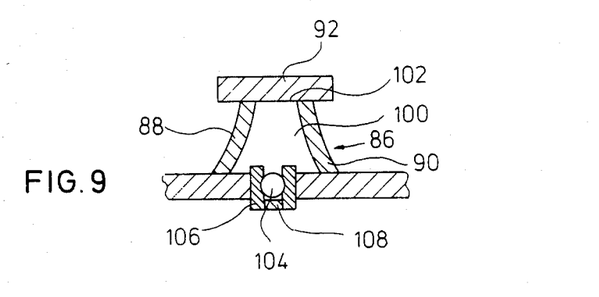
FIG. 9 is a fragment of a sectional view of another embodiment showing a sealed-in latex ball with an EVA bonding layer with covering.

FIG. 9 shows a sectional view of a further embodiment of the storage bag according to the invention in which instead of a tube member or insert a latex ball is connected with the bonding or intermediate layer.

The cut of the embodiment of the bag 10 shown in FIG. 9 corresponds substantially with the blank of the bag shown in FIG. 1 with the provision that in the region of the outlet means, as shown in FIG. 8 and explained, the two sheets forming the bag have tab-like extending regions 86 which on appropriate welding of their edges 88, 90 and 92 can completely sealingly enclose the latex ball 104 and the bonding or intermediate layer 106. Thus, the bonding or intermediate layer 106 and the latex ball 104 are sealed in sterile manner from the outside after this area has been welded.

The production takes place as for the embodiment illustrated in FIG. 8 but the bonding or intermediate layer 106 (in the form of a tubular portion) instead of to a tube member or insert described there is bonded (sealed, fused) with its inner surface at least partially to a substantially dimensionally stable insert 104 (e.g. as illustrated a latex ball or a latex cylinder). Instead of latex, the insert 104 may be made from any other suitable pierceable material neutral from the medical point of view. For the bonding or intermediate layer 106 the same material can be used as described above for the bonding layer 19, 53.

In FIG. 9, as in FIG. 8, the inner space is denoted by 100 and the weakening line by 102. In the embodiment shown in FIG. 9 the bonding or intermediate layer 106 may be flush with the bag edge or project outwardly and/or inwardly (into the bag) therebeyond or also be narrower than the bag edge. According to this embodiment, the injection or puncturing region is covered in sterile manner by the sheet. It is however also possible to cover the injection or puncturing region in a manner corresponding to that illustrated above for the other embodiments.

I claim:

1. A medical bag for containing liquids comprising a flexible bag body of plasticizer free thermoplastic polymeric material durable to autoclave sterilization to at least 120° C.,
   at least one substantially dimensionally stable tubular polymeric port member inserted into said bag body, wherein the polymer of said port member is different from the polymeric bag material,
   a bonding layer between said port member and the portions of the bag body in contact therewith of uncross-linked copolymer of olefin and vinyl acetate or of polyurethane.

2. Bag according to claim 1, characterized in that the tube member or insert (20, 22, 50, 72, 104) consists of hard PVC, polypropylene, polyamide, polycarbonate, polyester, polyacrylate, latex, a copolymer thereof or a copolymer thereof containing a styrene.

3. Bag according to claim 1, characterized in that the olefin is ethylene or propylene.

4. Bag according to claim 1 characterized in that the copolymer has a vinyl acetate content of 5-70% by weight.

5. Bag according to claim 4, characterized in that the copolymer has a vinyl acetate content of 10-50% by weight.

6. Bag according to claim 5, characterized in that the copolymer has a vinyl acetate content of 15-40% by weight.

7. Bag according to claim 1 characterized in that the polymeric material of the bag comprises polyethylene, polypropylene, poly-n-butylene, polyisobutylene, poly-4-methylpentene-1, chlorosulfonated polyethylene, polystyrene, halogenated polyethylenes or polymethyl methacrylate or their copolymers or mixed polymers.

8. Bag according to claim 7, characterized in that the polyethylene has a density of 0.9-0.94 and a melting range above 116° C.

9. Bag according to claim 7 characterized in that the polyethylene is in the form of a sheet and is laminated with a film of polyamide, polyvinylidene chloride, polyethylene terephthalate or polyester.

10. Bag according to claim 9, characterized in that the laminate consisting of polyethylene sheet and laminating sheet is up to 0.2 mm thick, the polyethylene sheet having a thickness of 50-100 μm and the laminating sheet a thickness of 20-100 μm.

11. Bag according to claim 1 characterized in that the bonding layer (19,53) is applied over the tube member (20,22) or the insert (50,72) and the copolymer of the bonding layer (19,53) is fused with the polyolefin of the bag (10) and the tube member (20,22) or the insert (50,72).

12. Bag according to claim 1 characterized in that the tube members (20,22) or the inlet or exit openings (76,78) provided in the insert (50,72) comprise infusion stoppers (77) or syringe injection stoppers (79) which are provided with a diaphragm (24) and a cap (25) or a pierceable insert (27).

13. Bag according to claim 1 characterized in that the tube member (20,22) or the inserts (50,72) comprise extensions (38,60,62,84).

14. Bag according to claim 13, characterized in that the extensions (38,60,62,84), the tube members (20,22) or the openings (76,78) are sealed with a pierceable diaphragm (24,42,64,80,94).

15. Bag according to claim 1 characterized in that on the bag (10) a filling opening (48) closable by welding is provided or in the insert (50,72) a closable filling opening (58,82).

16. Bag according to claim 14, characterized in that the diaphragm (42,64,80,94) is adjoined by a constriction or bead (44,66,96) of the opening (40).

17. Bag according to claim 1 characterized in that the extensions (38,60,62,84), the tube members (20,22) or the inserts (50,72) are provided with a removable closure member (40,70).

18. Bag according to claim 1 characterized in that the extensions (84) and the tube members (20,22) or the inserts (50,72) and the bonding layer (19,53) are welded round with one or more sheet regions (86).

19. Bag according to claim 1 characterized in that the bonding layer is made tubular and is connected at least partially along its outer periphery with the bag material and with regard to its inner surface is connected at least partially to the substantially dimensionally stable insert.

* * * * *